(12) United States Patent
Lühmann et al.

(10) Patent No.: US 7,175,898 B2
(45) Date of Patent: *Feb. 13, 2007

(54) REUSABLE ELASTIC ADHESIVE SHEET REDETACHABLE WITHOUT RESIDUE OR DAMAGE

(75) Inventors: Bernd Lühmann, Norderstedt (DE); Philippe Hesse, Buchholz (DE); Sianty Sunarto, Hamburg (DE); Uwe Schümann, Pinneberg (DE); Kirstin Weiland, Hamburg (DE); Andreas Junghans, Hamburg (DE)

(73) Assignee: tesa Aktiengesellschaft, Hamburg (DE)

( * ) Notice: Subject to any disclaimer, the term of this patent is extended or adjusted under 35 U.S.C. 154(b) by 142 days.

This patent is subject to a terminal disclaimer.

(21) Appl. No.: 10/813,195

(22) Filed: Mar. 30, 2004

(65) Prior Publication Data

US 2004/0265529 A1    Dec. 30, 2004

(30) Foreign Application Priority Data

Apr. 16, 2003 (DE) ................................ 103 17 788

(51) Int. Cl.
*B32B 9/00* (2006.01)
*B32B 33/00* (2006.01)

(52) U.S. Cl. ................ 428/40.1; 427/208.4; 428/41.7; 428/192; 428/194; 428/343; 428/354; 428/355 RA; 428/355 N; 528/44

(58) Field of Classification Search ............... 428/40.1, 428/41.7, 192, 194, 343, 354, 355 N, 355 RA; 528/44; 427/208.4
See application file for complete search history.

(56) References Cited

U.S. PATENT DOCUMENTS

| | | | |
|---|---|---|---|
| 4,024,312 A | 5/1977 | Korpman | 428/343 |
| 4,587,152 A | 5/1986 | Gleichenhagen et al. | 428/195 |
| 5,102,714 A | 4/1992 | Mobley et al. | 428/95 |
| 5,354,597 A | 10/1994 | Capik et al. | 428/152 |
| 5,491,012 A | 2/1996 | Lühmann et al. | 428/40 |
| 5,626,931 A | 5/1997 | Lühmann | 428/40.1 |
| 5,626,932 A | 5/1997 | Lühmann et al. | 428/40.1 |
| 5,693,584 A | 12/1997 | Le-Khac et al. | 502/159 |
| 5,712,216 A | 1/1998 | Le-Khac et al. | 502/175 |
| 5,897,949 A | 4/1999 | Lühmann et al. | 428/317.3 |
| 5,925,459 A | 7/1999 | Zimmermann et al. | 428/354 |
| 5,952,261 A | 9/1999 | Combs | 502/175 |
| 6,004,665 A | 12/1999 | Lühmann et al. | 428/317.3 |
| 6,040,028 A | 3/2000 | Cline et al. | 428/41.8 |
| 6,106,953 A | 8/2000 | Zimmermann et al. | 428/440 |
| 6,280,840 B1 | 8/2001 | Lühmann et al. | 428/343 |
| 6,284,378 B1 | 9/2001 | Junghans et al. | 428/421 |
| 6,372,335 B1 | 4/2002 | Lühmann et al. | 428/317.3 |
| 6,395,389 B1 | 5/2002 | Lühmann et al. | 428/343 |
| 6,402,875 B1 | 6/2002 | Lühmann et al. | 156/247 |
| 6,544,639 B1 | 4/2003 | Lühmann et al. | 428/343 |
| 6,680,096 B1 | 1/2004 | Lühmann et al. | 428/40.1 |
| 2003/0054164 A1 | 3/2003 | Zimmermann et al. | 428/343 |
| 2003/0059607 A1 | 3/2003 | Schumann et al. | 428/355 |
| 2004/0038040 A1* | 2/2004 | Schumann et al. | 428/423.1 |
| 2005/0019560 A1* | 1/2005 | Hesse et al. | 428/355 N |
| 2005/0019587 A1* | 1/2005 | Luhmann et al. | 428/423.1 |
| 2005/0027091 A1* | 2/2005 | Luhmann et al. | 528/44 |

FOREIGN PATENT DOCUMENTS

| | | |
|---|---|---|
| DE | 33 31 061 | 3/1985 |
| DE | 44 28 587 | 6/1996 |
| DE | 44 31 914 | 10/1996 |
| DE | 195 31 696 | 3/1997 |
| DE | 197 08 366 | 1/1998 |
| DE | 196 49 636 | 6/1998 |
| DE | 196 49 727 | 6/1998 |
| DE | 196 49 728 | 6/1998 |
| DE | 196 49 729 | 6/1998 |
| DE | 198 20 858 | 11/1999 |
| DE | 42 22 849 | 2/2000 |

(Continued)

OTHER PUBLICATIONS

Specification—U.S. Appl. No. 09/160,777, filed Sep. 24, 1998, English language counterpart to DE 195 31 696.

(Continued)

*Primary Examiner*—Nasser Ahmad
(74) *Attorney, Agent, or Firm*—Norris, McLaughlin & Marcus PA

(57) ABSTRACT

A single-sidedly or double-sidedly pressure-sensitively adhesive, elastic adhesive sheet comprising at least one layer of a pressure-sensitive adhesive, and having a maximum stretchability of more than 200% and a recovery of more than 60% after stretching to ⅔ of its maximum elongation, said pressure-sensitive adhesive (PSA) being based on a chemically crosslinked polyurethane, wherein the starting materials for the chemically crosslinked polyurethane include at least one isocyanate-reactive substance having a functionality of more than 2.0, in an amount of at least 5% by weight, based on the weight of the polyurethane composition, where the molecular weight of at least one of the starting materials used to form the polyurethane is being greater than or equal to 1000, at least one difunctional polyisocyanates are being used to form the polyurethane, and the ratio of maximum tensile stress to stripping stress is of said elastic adhesive sheet being more than 1.2, and the tensile stress at an elongation of 200% is being not more than 2.0 N/mm.sup.2.

17 Claims, No Drawings

FOREIGN PATENT DOCUMENTS

| | | |
|---|---|---|
| DE | 198 42 864 | 3/2000 |
| DE | 198 42 865 | 3/2000 |
| DE | 199 38 693 | 2/2001 |
| DE | 199 55 856 | 9/2001 |
| DE | 100 29 489 A1 | 3/2002 |
| DE | 100 55 942 | 6/2002 |
| EP | 0 149 135 | 7/1985 |
| EP | 0 328 925 | 8/1989 |
| EP | 0 761 793 A | 3/1997 |
| EP | 1 249 480 A | 10/2002 |
| EP | 1 285 955 A | 2/2003 |
| GB | 1 425 500 | 2/1976 |
| JP | 01-174581 A | 7/1989 |
| JP | 01-275687 A | 11/1989 |
| JP | 06 279 741 A1 | 10/1994 |
| JP | 08 188 755 A1 | 7/1996 |
| WO | WO 92/11332 | 7/1992 |
| WO | WO 92/11333 | 7/1992 |
| WO | WO 95/06691 | 3/1995 |
| WO | WO 96/18701 | 6/1996 |
| WO | WO 97/07172 | 2/1997 |
| WO | WO 98/03601 | 1/1998 |
| WO | WO 99/31193 | 6/1999 |
| WO | WO 99/51657 | 10/1999 |
| WO | WO 99/51661 | 10/1999 |
| WO | WO 99/56874 | 11/1999 |
| WO | WO 99/59719 | 11/1999 |
| WO | WO 99/64152 | 12/1999 |
| WO | WO 99/64493 | 12/1999 |
| WO | WO 01/62818 A1 | 8/2001 |

OTHER PUBLICATIONS

Geachter and Müller, *Taschenbuch der Kunststoff-Additive*, Munich, 1979.

Kirk-Othmer, *Encyclopedia of Chemical Technology* ($3^{rd}$), vol. 23, 615 to 627, John Wiley & Sons, New York (1983).

*Encyclopedia of Polymer Science and Technology*, vol. 14, 125 to 148, John Wiley & Sons, New York (1971).

Ullmann, *Encyklopadie der Technischen Chemie* ($4^{th}$), Band 8; 21; 15, 254ff, 676ff, Verlag Chemie GmbH, Weinheim/Bergstrasse (1974).

* cited by examiner

REUSABLE ELASTIC ADHESIVE SHEET REDETACHABLE WITHOUT RESIDUE OR DAMAGE

The invention relates to an elastic self-adhesive sheet which is single-sidedly or double-sidedly pressure-sensitively adhesive, which is washable after the pressure-sensitive adhesive (PSA) surface has been soiled, and can be used more than once, which in one further preferred embodiment causes little or no grease strikethrough on paper substrates, and which is preferably in the form of diecuts or cut shapes, intended for a bond which is redetachable without residue or damage, particularly on low-strength substrates such as paper, for example, and which is redetachable by extensive stretching and/or peeling from the bond substrate.

BACKGROUND OF THE INVENTION

A common application of transparent self-adhesive films such as, for example, tesa® Multifilm® from tesa AG, Hamburg (D), or Scotch® Magic from Minnesota Mining and Manufacturing Co. Inc., St. Paul (USA) is the temporary fastening of very light, usually flat articles such as, for example, very small pictures, photos, postcards, posters, drawings, decorations, etc., in the home, work, and office sectors. Self-adhesive films are often used here as alternatives to drawing pins and the like. Advantages of self-adhesive tapes as compared with the latter fastening means include their simple and unhazardous handling (no risk of injury), their substantial invisibility (owing to the high transparency of the self-adhesive films), the possibility of fixing to solid surfaces which needles cannot penetrate, and the possibility of redetaching a once-performed bond from sufficiently solid substrates without residue or destruction, by peeled removal of the adhesive film. The peel removal of self-adhesive films is an action which is typically known even to non-experts. A disadvantage of a fixture effected with self-adhesive films is that the said films are often not redetachable from low-strength substrates such as wallpapers, paper, paperboard, painted walls, etc., without at least partial destruction of the substrate.

Numerous PSA systems and self-adhesive tapes have been specially developed in order to allow bonds to be redetached without residue or destruction even from substrates which are in some cases of relatively low strength. One direction of development in this context has pursued the production of reversibly peel-removable single-sidedly or double-sidedly pressure-sensitively adhesive self-adhesive tapes. Typical examples of corresponding products make use, among others, of:

1. PSAs based on acrylate copolymers which are prepared by means of suspension polymerization (bead polymerization). Exemplary embodiments are described in WO 96/18701 A1, "Removable pressure sensitive adhesive and article" and the literature cited therein. Typical market products include "GELTAC Microsphere Adhesive Tabs" from PCI, Syracuse, N.Y. (USA) and "Postertape" from verkerke (Netherlands).
2. Self-adhesive tapes which are partly coated with PSAs and which acquire reversible peel removal properties by virtue, inter alia, of the nature of the partial coating. For exemplary embodiments see EP 0 149 135 A1 "Self-adhesive flat items removable without a trace" and EP 0 328 925 A1 "Self-adhesive flat items".
3. PSAs based on polyurethanes. Market products include "Doppio" from Oxford (GB), "Mount No. 30" from Cemedine or Tree's Klebe Pins from Plus AG.

Redetachable, reusable PSAs based on polyurethane are described in, for example, U.S. Pat. Nos. 6,040,028 A or 5,102,714 A. Double-sided adhesive tapes with an in elastic backing, comprising one or more redetachable, washable, reusable PSAs based on polyurethane, are known from, for example, JP 08 188 755 A1 or JP 06 279 741 A1.

4. Other PSA systems, for example those based on solution-polymerized acrylate copolymers, natural rubber/resin blends, ethylene-vinyl acetate copolymers, to name but a few, whose profile of adhesive properties is controlled in such a way as to allow the production of adhesive tapes having very low peel forces. Market products include, "Scotch transparent mounting squares" from Minnesota Mining and Manufacturing Co. Inc. and "Pritt on&off" from Henkel.
5. Plastically deformable PSA products, which can be portioned and shaped like modelling clay and of which examples include those known under the brand name "Blu-Tac" (Bostik), "UHU tac patafix" (Uhu GmbH) or "Pritt Buddies" (Henkel).

On the basis of the aforementioned PSA systems it is possible to produce single-sidedly or double-sidedly pressure-sensitively adhesive self-adhesive products which as a consequence of their low peel forces can be redetached without residue or destruction simply by peeling even from substrates which are in some cases of relatively low strength. Through the use of double-sidedly pressure-sensitively adhesive self-adhesive tapes it is possible in the same way to redetach flexible materials such as, for example, posters, papers, and polymer films, etc. without residue or destruction even from substrates which are in some cases of relatively low strength.

The abovementioned self-adhesive articles, however, have numerous disadvantages:

In all cases in which it is possible to redetach the self-adhesive products without residue or damage from low-strength substrates such as, for example, wallpaper, paper, paperboard, painted walls, etc., by peeling it is possible only to realise extremely low bond strengths. It should be borne in mind here that the forces exerted on the bond substrate when detaching self-adhesive tapes are transmitted along a very narrow line and consequently, even in the case of low peel forces, considerable peel stresses (normal stresses) can act on the bond substrate, and may give rise at least to partial damage of low-strength substrates along this narrow line.

In the fixing of two rigid adherends, owing to their lack of flexibility it is impossible to redetach them without residue or destruction by peeling. Any attempt to part the bond by cleaving the adhesive bond is typically accompanied by such high cleavage forces (normal forces) (acting orthogonally with respect to the adherends) that at least partial destruction of one of the adherends in many cases cannot be ruled out.

The abovementioned products typically show an increase in the peel force required for their redetachment over time. Thus, for example, for Pritt on&off (Henkel) and, "GELTAC Microsphere Adhesive Tabs" from PCI, Syracuse, N.Y. (USA), it is observed that freshly adhered poster papers can be redetached without residue or destruction from painted woodchip wallpaper. If, however, the posters have been adhered to the same wallpaper substrate for several weeks, which corresponds to a typical application time, the peel forces, which are now markedly higher, mean that the posters and the wallpaper are often severely damaged in the course of peel detachment. Residueless and non-destructive detachment from sensitive substrates is therefore possible only to a limited extent, and in many cases not at all.

A serious disadvantage of many of the abovementioned self-adhesive products is their characteristic of causing grease strikethrough on paper and paperboard substrates in particular and hence of irreversibly altering the optical and mechanical properties of such substrates. This is particularly annoying when optical alterations which occur permanently adversely change the aesthetics of an article to be bonded or of the substrate. This disadvantage occurs particularly for all existing polyurethane-based PSAs.

A further disadvantage of aforementioned peel-detaching, non-washable self-adhesive tapes is that such tapes typically, after use or after, for example, soiling (as a result, for example, of finger contact or contact with soiled surfaces), exhibit a marked reduction in their adhesion and hence typically cannot be reused without a marked loss of performance.

Self-adhesive tapes which are redetachable by peeling without residue or destruction can therefore be utilized for a multiplicity of fastening tasks, particularly for very lightweight, flat articles, but at the same time, as demonstrated, have a significant number of disadvantages.

A second direction of development in PSA systems and self-adhesive tapes for the residueless and non-destructive redetachment of adhesive bonds even on substrates of relatively low strength is pursuing the production of elastically or plastically highly extensible (strippable) self-adhesive tapes which can be redetached without residue or destruction by extensive stretching in the bond plane.

Typical examples are known from publications including U.S. Pat. No. 4,024,312 A, DE 33 31 016 C1, WO 92/11332 A1, WO 92/11333 A1, DE 42 22 849 A1, WO 95/06691 A1, DE 195 31 696 A1, DE 196 26 870 A1, DE 196 49 727 A1, DE 196 49 728 A1, DE 196 49 729 A1, DE 197 08 366 A1, WO 99/31193 A1, DE 198 20 858 A1 and DE 100 55 942 A1. They are frequently employed in the form of adhesive tape strips (adhesive sheet strips), which preferably have a non-adhesive grip tab region, starting from which the detachment operation is initiated. Specific embodiments of aforementioned self-adhesive tapes are described in, for example, in DE 44 28 587 A1, DE 44 31 914 A1, WO 97/07172 A1, DE 196 27 400 A1, WO 98/03601 A1, DE 196 49 636 A1, DE 198 42 864 A1, DE 198 42 865 A1 and DE 199 38 693 A1. Advantages of self-adhesive tapes redetachable without residue or destruction by extensive stretching are to make these tapes such that the stretching which is performed in the course of detachment significantly reduces the adhesion of the PSA. As a result, the detachment forces (normal stresses) which act on the adherends orthogonally to the bond surface in the course of detachment are very low. This makes it possible to redetach adhesive tapes, even those possessing very high peel strengths, and even from highly sensitive substrates, without residue or destruction. A particular advantage in comparison to the above-described adhesive tapes which are redetachable by peeling is the fact that even planar bonds between rigid adherends can be redetached without residue or destruction.

The self-adhesive tapes described in aforementioned documents and redetachable by extensive stretching in the bond plane have been designed, however, for the bonding of articles of medium to heavy weight, and so must have high bond strengths and hence also such high peel strengths that reversible peeling from the majority of substrates is impossible. A further disadvantage is that the redetachment by extensive stretching only functions reliably without damage when the adhesive sheets have been cut essentially into strip form or into an at least elongate form and when the extensive stretching takes place in the lengthwise direction of these forms. Moreover, generally speaking, a non-adhesive grip tab region is necessary, particularly when bonding is to take place onto substrates of relatively low strength, on which even only slight peeling in the initial region of the bond section leads to damage to the substrate.

It is apparent that, particularly for the fixing of small articles, adhesive tapes which have very low stripping forces would be advantageous in order to allow easy and simple detachment, including for example by children.

A very large proportion of the fixtures desired in the home and office sectors relate, as described above, to small and very small articles, such as, for instance, the fixing of very small pictures, postcards, photos, drawings, and, typically, articles attached to notice boards, for the fastening of which, conventionally, simple self-adhesive films, drawing pins and the like frequently offer sufficient bonding performance. For aforementioned applications, the self-adhesive tapes on the market hitherto and described in abovementioned documents, which are redetachable by stretching in the bond plane, are thus not very suitable. Disadvantages are that they are inconvenient to handle and that they cannot generally be used more than once, either since as a result of the extensive stretching they undergo irreversible plastic deformation or become screwed up adheringly in such a way that straightening them out is no longer possible.

It is apparent, furthermore, that the operation of detachment by extensive stretching in the bond plane is for many users not an action which has been mastered in the same way as for the parting of a bond by peeling. This frequently turns out to be a disadvantage, since in numerous instances the parting of the adhesive bond must take place by a stretching precisely parallel to the existing bond plane in a preferential direction, in order to ensure tearing of the adhesive strips and a residueless and non-destructive parting of the adhesive bond.

A disadvantage of aforementioned self-adhesive tapes which occurs here as well is that such tapes, following use or, for example, soiling (for example, by finger contact or by contact with soiled surfaces), display a marked reduction in their adhesiveness and hence cannot be used again without a marked loss of performance.

It is an objective of the present invention, accordingly, to provide single-sidedly or double-sidedly pressure-sensitively adhesive sheets, preferably in the form of diecuts or cut shapes, which are suitable for redetachable bonding without residue or damage of small, lightweight articles having a low-strength surface, such as, for example, a paper surface, and which no longer have the depicted disadvantages of the prior art, or not to the same extent.

In particular, it ought to be possible to part the bonds without residue or damage even when peeling is not possible, owing to the geometric circumstances in the area surrounding the bond site, this being the case particularly when rigid adherends are fixed to one another or when the bond has already existed for a relatively long time, several months for example, and consequently the peel force, depending on the nature of the bonded substrate, may possibly have risen sharply in comparison to the peel force in the case of a fresh bond. The redetachment without residue or damage should be realizable always easily and in any direction, irrespective of the external form of the PSA sheet. It should be possible to reuse the PSA sheet in any case, even when the PSA of the sheet has been soiled or when the sheet has become screwed up.

SUMMARY OF THE INVENTION

This object is achieved by a washable, reusable, elastic adhesive sheet as specified in the main claim, preferably in the form of diecuts or cut shapes, which allows the redetachment of adhesive bonds without residue or damage by peeling and/or extensive stretching of the adhesive sheet or allows any desired combination of both types of detachment, so that the advantages of both types of detachment are combined with one another and the intended or unintended screwing-up is smoothed out again largely of itself or at least can be smoothed out. The dependent claims provide advantageous developments of the adhesive sheet, processes for producing it, and possibilities for use.

DETAILED DESCRIPTION

The invention accordingly provides a single-sidedly or double-sidedly pressure-sensitively adhesive, elastic adhesive sheet which can be used more than once and is preferably in the form of diecuts or cut shapes, intended for the redetachment of adhesive bonds without residue or damage, particularly on low-strength substrates such as paper, for example, by peeling and/or extensive stretching of the adhesive sheet.

The adhesive sheet is composed of at least one layer of a pressure-sensitive adhesive. The adhesive sheet further has a maximum stretchability of more than 200% and a recovery of more than 60% after stretching to ⅔ of its maximum elongation.

The pressure-sensitive adhesive (PSA) of the adhesive sheet is based on a chemically crosslinked polyurethane, the starting materials for the chemically crosslinked polyurethane including at least one isocyanate-reactive substance having a functionality of more than 2.0, in a fraction of at least 5% by weight, based on the polyurethane composition, where
  the molecular weight of at least one of the starting materials used to form the polyurethane is greater than or equal to 1000,
  at least difunctional polyisocyanates are used to form the polyurethane, and
  the ratio of maximum tensile stress to stripping stress is more than 1.2, preferably more than 1.5, more preferably more than 2.0, and
  the tensile stress at an elongation of 200% is not more than 2.0 N/mm$^2$, preferably not more than 1.0 N/mm$^2$, more preferably not more than 0.5 N/mm$^2$.

In a first advantageous embodiment the polyurethane of the elastic adhesive sheet is composed of the following starting materials which are reacted with one another in the stated proportions:
  at least one difunctional polyisocyanate,
  a combination of at least one polypropylene glycol diol and at least one polypropylene glycol triol,
the ratio
  of the number of hydroxyl groups in the diol component to the number of hydroxyl groups in the triol component being preferably between 0.7 and 9.0, more preferably between 1.5 and 2.5,
  of the number of isocyanate groups to the total number of hydroxyl groups being between 0.5 and 1.3, preferably between 0.8 and 1.2, more preferably between 0.95 and 1.05, where
  diols having a molecular weight of less than or equal to 1000 are combined with triols whose molecular weight is greater than 1000, preferably greater than or equal to 3000, or
  diols having a molecular weight of greater than 1000 are combined with triols whose molecular weight is less than 1000.

In the inventive manner outlined above the polyurethane-based PSA of the adhesive sheet of the invention is configured such that migration of migratory constituents of this PSA into the bond substrates (paper, for example) is so low that the said substrates suffer negligible, if any, "grease strikethrough".

With further preference the adhesive sheet has a maximum stretchability of more than 300%, more preferably more than 400%, and/or a recovery of more than 80%, preferably more than 90%, after stretching to ⅔ of its maximum elongation.

Elastic adhesive sheets of the invention are, accordingly, pressure-sensitively adhesive on one or both sides, the PSA always being formed on the basis of a chemically crosslinked polyurethane.

In one particular embodiment the elastic adhesive sheet of the invention has on one side a backing sheet, on which the PSA has been applied.

In further embodiments the elastic adhesive sheet of the invention is a two-ply or multi-ply laminate composed of one or more elastic backing sheets and one or more polyurethane-based PSAs.

In order to improve the anchorage between the individual layers it is possible to use any known methods of surface treatment, such as corona pretreatment, flaming, gas-phase treatment (fluorination, for example). It is likewise possible to use any known methods of priming, in which case the primer layer can be applied either from solution or from dispersion or else in an extrusion or coextrusion process.

Non-adhesive surfaces of the adhesive sheet can be obtained in a variety of ways, not only by using non-tacky, elastic backing sheets. Examples include the use of a flexible, non-elastic film liner, although different forms of coating or else of inertizing by means, for example, of pulverulent materials can be utilized in accordance with the invention. Only a few selected possibilities are mentioned, which are not intended to restrict the subject-matter of the invention in any way whatsoever. Comparable possible solutions will be clear to the person skilled in the art without further pondering.

Besides adhesive tapes which utilize a two-ply construction, being composed of a PSA polyurethane and of a suitable non-self-adhesive, and hence inert, layer, multi-ply product constructions are also suitable for use in accordance with the invention, particularly those comprising two or more polyurethane-based layers, or products utilizing further elastic layers based on, for example, acrylate copolymers, rubbers, and so on.

Double-sidedly pressure-sensitively adhesive sheets can be of multi-ply product construction, with the PSA being applied, for example, to both sides of an intermediate film carrier.

It is further possible in accordance with the invention to utilize adhesive sheets which have been executed in non-tacky form at one or more ends or else partially in accordance with DE 196 49 636 A1, so that there are one or more grip tab regions, starting from which the parting of the adhesive bond can be performed advantageously.

The external form of adhesive sheets of the invention is widely adjustable. Possible for utilization in accordance with the invention are, in particular, adhesive sheets which are shaped at one or more ends in accordance with DE 44 28 587 C2, DE 198 42 865 A1 or DE 199 38 693 A1 or those having shapes in accordance with DE 196 49 636 A1. The exemplary embodiments specified in these documents are hereby expressly incorporated by reference to become part of the disclosure content of this invention.

Polyurethane-based PSAs which can be used in accordance with the invention are formed by chemical reaction of at least difunctional polyisocyanate with one or more isocyanate-reactive substances, preferably polyols, these substances containing at least 5% by weight, based on the polyurethane composition, of a substance having a functionality of more than 2.0, the molecular weight of at least one of the substances used to form the polyurethane being greater than or equal to 1000 and the strength of the pressure-sensitive adhesion being harmonized with the tensile stretch characteristics of the elastic sheet in such a way that the ratio of maximum tensile stress to stripping stress in the adhesive sheet of the invention is more than 1.2, preferably more than 1.5, more preferably more than 2.0.

Of preferred suitability are polyurethane-based PSAs as described above in which the PSA is formulated such that migration of its migratory constituents into the bond substrates (paper, for example) is so low that said substrates suffer negligible, if any, "grease strikethrough". Polyurethanes of this kind are composed of the following starting materials which are reacted with one another in the stated proportions:

at least one difunctional polyisocyanate, preferably at least one aliphatic or alicyclic diisocyanate, more preferably at least one aliphatic or alicyclic diisocyanate having an asymmetrical molecular structure, a combination of at least one propylene glycol diol and at least one polypropylene glycol triol, the ratio of the number of hydroxyl groups in the diol component to the number of hydroxyl groups in the triol component being preferably between 0.7 and 9.0, more preferably between 1.5 and 2.5, additionally the ratio of the number of isocyanate groups to the total number of hydroxyl groups being between 0.5 and 1.3, preferably between 0.8 and 1.2, more preferably between 0.95 and 1.05, and diols having a molecular weight of less than or equal to 1000 being combined with triols whose molecular weight is greater than 1000, preferably greater than or equal to 3000, or diols having a molecular weight of greater than 1000 being combined with triols whose molecular weight is less than 1000.

It is particularly preferred if the polyisocyanate is an aliphatic or alicyclic diisocyanate, more preferably an aliphatic or alicyclic diisocyanate having an asymmetrical molecular structure. With very particular preference the isocyanate is isophorone diisocyanate.

As polyisocyanates it is possible in accordance with the invention to use all known at least difunctional polyisocyanates. These include not only all aromatic types, such as, for example, the isomers of diphenylmethane diisocyanate (MDI), of diphenyldimethyl-methane diisocyanate, of dibenzyl diisocyanate, of phenylene diisocyanate, of tolylene diisocyanate (TDI) or of naphthylene diisocyanate, but also all aliphatic or alicyclic types, such as, for example, butane 1,4-diisocyanate, tetramethoxybutane 1,4-diisocyanate, hexane 1,6-diisocyanate, ethylene diisocyanate, dicyclohexylmethane diisocyanate, 1,4-diisocyanatocyclohexane, 1,3-diisocyanatocyclohexane, 1,2-diisocyanatocyclohexane, 1,3-diisocyanatocyclopentane, 1,2-diisocyanatocyclopentane, 1,2-diisocyanato-cyclobutane, norbonane diisocyanatomethyl, chlorinated, brominated, sulphur- or phosphorus-containing aromatic, aliphatic or alicyclic diisocyanates, and also derivatives of the diisocyanates listed, especially dimerized or trimerized types, and, furthermore, types containing aromatics in which the isocyanate groups themselves are not aromatically attached, such as, for example, the isomers of tetramethylxylylene diisocyanate (TMXDI) or of xylylene diisocyanate.

Surprisingly it has been found that aliphatic or alicyclic diisocyanates having in each case an asymmetrical molecular structure, in which, in other words, the two isocyanate groups each possess a different reactivity, are particularly suitable for producing pressure-sensitively adhesive polyurethanes in which, in particular, the tendency otherwise typical of pressure-sensitively adhesive polyurethanes, namely that of leaving greasy-looking spots on paper or paperboard, is markedly reduced. By asymmetrical molecular structure is meant the absence from the molecule of any elements of symmetry (for example mirror planes, axes of symmetry, centres of symmetry); in other words, the impossibility of performing any symmetry operation that produces a molecule congruent with the starting molecule.

Examples of suitable diisocyanates having an asymmetrical molecular structure are 2,2,4-trimethylhexamethylene diisocyanate, ethylethylene diisocyanate, 1-isocyanato-methyl-3-isocyanato-1,5,5-trimethylcyclohexane (isophorone diisocyanate, IPDI), 1-methyl-2,4-diisocyanatocyclohexane, 1,6-diisocyanato-2,2,4-trimethylhexane, 1,6-diisocyanato-2,4,4-trimethylhexane, 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-1-(4-isocyanatobut-1-yl)-1,3,3-trimethylcyclohexane, 1-isocyanato-2-(3-isocyanatoprop-1-yl)cyclohexane, 1-isocyanato-2-(2-isocyanatoeth-1-yl)cyclohexane or 2-heptyl-3,4-bis(9-isocyanatononyl)-1-pentylcyclohexane.

As isocyanate-reactive substances it is possible to use any substances known for the preparation of polyurethane PSAs, including polyols, these substances including a fraction of at least 5% by weight, based on the polyurethane composition, of at least one substance having a functionality of more than 2.0, and the molecular weight of at least one of the substances used to form the polyurethane being greater than or equal to 1000. The substances are selected in accordance with the profile of properties to be established in the elastic adhesive sheet, in particular in accordance with the ratio of ultimate tensile strength to stripping force that is to be established.

Suitable examples include all polyether-polyols, such as polyethylene glycols, polypropylene glycols, polytetramethylene glycol ethers (polytetrahydrofurans), polyesterpolyols, polycaprolactones, polycarbonates, hydroxyl-functionalized polybutadienes or other polyols containing carbon-carbon double bonds, hydrogenated forms of the last-mentioned examples, such as hydrogenated hydroxyl-functionalized polyisoprenes, hydroxyl-functionalized polyisobutylenes or hydroxyl-functionalized polyolefins.

Also suitable, furthermore, are all amino-bearing polyethers which are customary in polyurethane chemistry, since the polyureas resulting therefrom are considered to be polyurethanes in practice (cf. Kunststoff-Handbuch, Vol. 7, Polyurethanes). All of the substances listed can be used with a functionality of 1.0 (monools), 2.0 (diols), 3.0 (triols), with a functionality lying between these values, or with any desired other functionality, or in a mixture.

Besides the isocyanate components recited above and the components which react with them, however, it is also possible to use other starting materials to form the polyurethane, without departing from the concept of the invention.

As polypropylene glycols it is possible to use all commercially customary polyethers based on propylene oxide and on a starter which is difunctional in the case of the diols and trifunctional in the case of the triols. Included here are not only the polypropylene glycols prepared conventionally—that is, generally by using a basic catalyst, such as potassium hydroxide, for example—but also the particularly pure polypropylene glycols prepared by DMC (double metal cyanide) catalysis, whose preparation is described in, for example, U.S. Pat. Nos. 5,712,216 A, 5,693,584 A, WO 99/56874 A1, WO 99/51661 A1, WO 99/59719 A1, WO 99/64152 A1, U.S. Pat. No. 5,952,261 A1, WO 99/64493 A1 and WO 99/51657 A1. A characteristic of the DMC-catalysed polypropylene glycols is that the "nominal" or theoretical functionality of exactly 2.0 in the case of the diols or exactly 3.0 in the case of the triols is also actually achieved approximately. In the case of the conventionally prepared polypropylene glycols the "true" functionality is always somewhat lower than the nominal functionality, especially in the case of polypropylene glycols having a relatively high molecular weight. One of the reasons for this is a secondary reaction of rearrangement of the propylene oxide to form allyl alcohol.

It is also possible to use any polypropylene glycol diols or triols containing copolymerized ethylene oxide, which is the case in many commercially customary polypropylene glycols, in order to obtain an increased reactivity towards isocyanates.

By varying the ratio of the number of hydroxyl groups in the diol to that in the triol it is possible to adjust the bond strength in accordance with the application. Surprisingly it has been found that the higher the ratio of the number of diol OH groups to the number of triol OH groups, the greater the bond strength.

The bond strength can additionally be adjusted by way of the ratio of the number of isocyanate groups to the total number of hydroxyl groups. The trend here is for the bond strength to increase as said ratio deviates from 1 towards lower values.

In one possible embodiment the polyurethane-based PSA includes further formulating ingredients such as, for example, catalysts, ageing inhibitors (primary and secondary antioxidants), light stabilizers, such as UV absorbers, for example, Theological additives, colour pigments, dyes, and other auxiliaries and additives.

When selecting these substances it should be ensured, with a view to the "grease strikethrough" phenomenon, that these substances do not have any tendency to migrate towards the substrate to be bonded, so that there is no spotting or else discoloration occurring in this way. For the same reason the concentration of these substances, particularly of the liquid substances, in the composition as a whole is to be minimized. The additional use of plasticizers or tackifier resins should for this reason be reduced, without any intention that these substances should hereby be excluded altogether.

In order to accelerate the reaction between the isocyanate component and the isocyanate-reactive component it is possible to use any of the catalysts known to the person skilled in the art, such as tertiary amines, organobismuth compounds or organotin compounds, for example, to name but a few.

The use of antioxidants, though advantageous, is not mandatory. Suitable antioxidants include, for example, sterically hindered phenols, hydroquinone derivatives, sterically hindered amines, organic sulphur compounds and organic phosphorus compounds.

Light stabilizers, such as UV absorbers, can optionally also be used.

Light stabilizers used are those disclosed in Gaechter and Müller, Taschenbuch der Kunststoff-Additive, Munich, 1979, in Kirk-Othmer (3.) 23, 615 to 627, in Encycl. Polym. Sci. Technol 14, 125 to 148 and in Ullmann (4.) 8, 21; 15, 259, 676.

Examples of rheological additives are pyrogenic silicas, phyllosilicates (bentonites, for example), high molecular mass polyamide powders or castor oil derivative powders.

For colouring the PSA all known colour pigments or dyes which can be employed in polyurethane chemistry are suitable, including particularly those which produce transparent or translucent colour effects.

In one preferred embodiment the pressure-sensitive adhesive is prepared continuously in accordance with the process described below:

A vessel A is charged substantially with the premixed, isocyanate-reactive substances (polyol component) and a vessel B is charged substantially with the isocyanate component, it being possible for the further formulating ingredients to have been mixed into these components beforehand in a standard mixing procedure. The polyol component and the isocyanate component are conveyed via precision pumps through the mixing head or mixing tube of a multi-component mixing and metering unit, where they are homogeneously mixed and so brought to reaction. The chemically inter-reactive components mixed in this way are applied immediately thereafter to a sheet-like backing material, which is preferably moving at a constant speed.

The nature of the sheet-like backing material depends on the precise product construction of the elastic adhesive sheet. For example, particularly for the case of a single-ply product construction, this backing material can be an essentially inelastic sheet-like backing material which has been made antiadhesive and which serves as a liner sheet for the elastic adhesive sheet of the invention; it can be the elastic backing sheet and hence part of the actual product construction; or else, particularly for the case of an elastic, double-sidedly pressure-sensitively adhesive sheet, it can be an elastic backing sheet which has already been precoated on one side with a polyurethane PSA, without wishing to restrict the invention with these examples.

The backing material coated with the reactive polyurethane composition is passed through a heating tunnel, in which the polyurethane composition cures to the PSA. The coatweight of the polyurethane composition is freely selectable. It depends on the product properties to be established in detail, in which case the typical product thicknesses set out above are preferably observed. Finally the coated backing material is wound up in a winding station.

The process described allows solvent-free and water-free operation. Solvent-free and water-free operation is the preferred procedure, but is not mandatory. In order, for example, to obtain particularly low coatweights the components can be diluted appropriately. In order to enhance the anchorage of the polyurethane composition on the elastic backing sheet it is possible to employ any known methods of surface pretreatment, such as corona pretreatment, f laming, g as-phase treatment (fluorination, for example). It is likewise possible to use any known methods of priming, in which case the primer layer can be applied either from solution or dispersion or else in an extrusion or coextrusion process.

In order to improve the unwind properties of the wound roll in the case of a single-sidedly pressure-sensitively adhesive elastic sheet it is possible to precoat the reverse of the elastic backing sheet with a release coating material or else for the reverse to carry a coextruded or extruded-on release coating.

Adhesive sheets of the invention can comprise backing films which include one or more stretchable film layers, corresponding for example to EP 0 761 793 B1. Preferred elastomers are styrene block copolymers, natural rubber, polyisoprene, polybutadiene, polychloroprene rubber, butyl rubber, silica rubber, EPDM rubber or ethylene-propylene copolymers, polyurethanes (such as, for example, A-3600 (Wolff Walsrode), Platilon UO 1 (Atochem), Desmopan (Bayer), Elastollan (Elastogran)), vinyl copolymers, ethylene-vinyl acetate copolymers, vinyl chloride-acrylate copolymers, polyether-esters (for example Arnitel (Akzo), Hytrel (Du Pont)), polyether-amide and polyester-amides (for example Pebax (Atochem), Grilon (Ems-Chemie)), polycarbonate-polyester copolymers, ethylene-acrylate copolymers, acrylate copolymers or ABS copolymers. It is also possible for the aforementioned elastomers to be used as an ingredient in polymer blends. In order to establish the mechanical properties it may be advantageous to crosslink aforementioned materials. Adhesive sheets of the invention are composed preferably of elastic backing sheets based on polyurethane, which additionally have pressure-sensitive adhesive properties. The backing sheets may further comprise formulating ingredients, such as ageing inhibitors (antioxidants), light stablizers, UV absorbers, colour pigments, dyes, fillers, and other auxiliaries and additives, for example. The backing sheets or individual layers thereof may also have been foamed with a gas or have undergone a change in volume as a result of the addition of expandable or pre-expanded microballoons, hollow and solid glass microbeads.

The thickness of the adhesive sheet, especially when the adhesive sheet is formed from one layer of a pressure-sensitive adhesive, is typically between 50 µm to 3000 µm, preferably 100 µm to 2000 µm, more preferably 500 µm to 1500 µm.

Adhesive sheets of the invention have peel strengths (bond strengths) on steel, determined at a peel angle of 90°, of between 0.05 and 8 N/cm, preferably between 0.3 and 5 N/cm, more preferably between 0.5 and 3 N/cm.

An advantage found in the context of the peel removal of single-sidedly pressure-sensitively adhesive sheets of the invention is that the peel strengths measured are significantly lower than those of similar adhesive sheets of equal thickness which additionally include a dimensionally stable backing, for example a film backing based on biaxially oriented polyethylene terephthalate. The reason for this advantageous behaviour may lie in elongation of the adhesive sheet during detachment.

The stripping stresses which are measured in the course of detachment by extensive stretching in the bond plane are less than 2.5 N/mm$^2$, preferably less than 2.5 N/mm$^2$, more preferably less than 1.0 N/mm$^2$, the ratio of maximum tensile stress to stripping stress being greater than 1.2, preferably greater than 1.5, more preferably greater than 2.0. As compared with PSAs such as those utilized by EP 0 761 793 B1, the adhesive sheets which can be used in accordance with the invention typically exhibit a significant drop in bond strength on stretching, which is probably a reason for the very good detachability that is observed.

Adhesive sheets of the invention have maximum tensile stresses of between 0.1 and 20 MPa, preferably between 0.2 and 10 MPa, more preferably between 0.5 and 5.0 MPa.

The maximum stretchability is greater than 200%, preferably greater than 300%, more preferably greater than 400%. The tensile stresses at 200% elongation are not more than 2.0 N/mm$^2$, preferably not more than 1.0 N/mm$^2$, more preferably not more than 0.5 N/mm$^2$.

Adhesive sheets of the invention can be reused more than once without significant reduction in the PSA properties. Even after significant soiling with, for example, solid particulate materials, cleaning with water and subsequent drying restore, to adhesive sheets corresponding to preferred embodiment, bond strengths which are >65% of the initial bond strength, preferably >70% of the initial bond strength, more preferably >80% of the initial bond strength. When adhesive sheets of the invention have undergone curling, this curling becomes smoothed out again largely by itself, especially when the sheets are in the preferred form of diecuts or cut shapes. Relatively large sheet sections can be smoothed out again relatively easily by hand. The cause of this advantageous behaviour may lie in the characteristic of crosslinked polyurethane PSAs not to undergo blocking with themselves, i.e. to be readily redetachable from themselves, in conjunction with the internal stress of the elastic backing sheet.

In another preferred embodiment the PSA of adhesive sheets of the invention is such that migration of migratory adhesive constituents into the bond substrates is so slight that there is negligible, if any, "grease strikethrough". Testing is carried out by bonding to various everyday types of paper (newspaper, magazine paper, writing paper, poster paper), detachment after several weeks and subsequent visual assessment.

The PSA sheet of the invention can be used with particular advantage for fastening notes, sheets of paper, calendar pages, strips, cards or cartons made of paperboard, cardboard or plastic, small utility articles made of plastic, wood, glass, stone or metal.

The following test methods were used briefly to characterize the specimens produced in accordance with the processes described:

Peel strength, bond strength (90° peel angle)

The peel strength (bond strength) was tested in accordance with PSTC-101 (peel adhesion). In accordance with this method the elastic adhesive sheet of the invention in strip form, with a width of 10 mm and an adhesive strip length of 50 mm, is applied to a variety of substrates (steel, PETP, PVC, paper (usual commercial paper for copiers)) and subsequently peeled off under defined conditions by means of a tensile testing machine. The peel angle is in each case 90° and the separation speed 300 mm/min.

The value reported is the mean value of the peel force in the region in which the adhesive strip has undergone detachment from the substrate by between 10 mm and 40 mm. The force required for removal is the peel strength or bond strength, which is reported with the units N/cm. The extent to which the adhesive strips under investigation stretch during peel removal varies as a function of their type and thickness. For purposes of comparison, the investigation also included adhesive strips which had been made inelastic by means of a stiff reverse-face reinforcement (with a 25 µm polyester film).

Stripping stress (stress during detachment by extensive stretching in the bond plane)

To determine the stripping stress when the adhesive bond is detached by extensive stretching, the elastic PSA sheet under test, with dimensions of 20 mm×50 mm, provided on both sides with a non-adhesive grip tab region (obtained by laminating on a 25 µm, biaxially oriented polyester film of dimensions 10 mm×13 mm (Hostaphan RN 25)), is adhered to a high-gloss-polished steel plate. A second steel plate is placed on the strip product, congruently with the first steel plate, and then pressed on using a steel roller weighing 2 kg. The test specimens prepared in this way are stored under the corresponding conditions (23° C., 50% relative humidity [RT]) for 3 days.

In accordance with the thickness of the test specimen, one blade of the feeler gauge is inserted between the steel plates so that the clamping jaws of a tensile testing machine do not compress the sample. Using the grip tab, the test specimen is stripped out from between the steel plates with a pulling speed of 1000 mm/min.

The parameter determined is the force per test specimen cross-section.

The figure reported is the mean value of the stripping stress (in N/mm²) in the range in which the adhesive strip has undergone detachment from the steel substrate by between 10 mm and 40 mm.

If damage to the test specimen becomes visible during the stripping operation, it is reported in addition to the stripping forces.

Maximum tensile stress//maximum stretchability (stress-strain test)

Measurements are made, unless noted otherwise, in accordance with DIN EN ISO 527-1 to 3 using standard test specimens of size 5A and a separation speed of 300 mm/min. The maximum tensile stress is the maximum force measured during stretching of a test material, divided by the initial cross-sectional area of the sample, and is reported with the units $N/mm^2$. The maximum stretchability is the change in length, relative to the original measured length of the test strip, under maximum weight loading, and is reported with the units %.

Ratio of maximum tensile stress to stripping stress

The ratio of maximum tensile stress to stripping stress is obtained by dividing the values obtained in accordance with DIN EN ISO 527 (see above) and the stripping stress (see above).

Recovery

Measurements are made, unless noted otherwise, in accordance with DIN EN ISO 527-1 to 3 using standard test specimens of 5 A. The recovery is determined by stretching adhesive strips of the aforementioned kind, provided beforehand with marks at both ends of the adhesive strip, to allow effective measurement, to approximately 67% (about ⅔) of their maximum stretch (determined as described above under "maximum tensile stress//maximum stretchability"), left at this stretch for 10 seconds, and then released again. The recovery RV, expressed in %, is calculated in accordance with the following formula:

$$RV=(LV-LR)/(LV-L0)*100$$

where:
RV: Recovery in %;
L0: Distance between the marks on the adhesive strip before stretching;
LV: Distance between the marks on the adhesive strip in the stretched state;
LR: Distance between the marks on the adhesive strip as determined 2 minutes after complete release.

Reusability

A determination is made of the peel strength (see above) of adhesive strips on which five successive tests of stripping force and also five successive tests of peel strength have been conducted. Peel values which indicate good possibility for reuse more than once are >65% of the initial value, preferably greater than >80% of the initial value.

Reusability after soiling

First of all a determination is made of the peel strength (fresh value). After the measurements have been conducted, the test adhesive strips are deliberately "soiled" with fine sand and finely ground chalk. Adhesive strips thus treated typically no longer have a perceptible tack. After about 30 seconds of cleaning with running cold mains water the applied soiling is typically all removed. The adhesive strips are dried in a stream of cold or hot air and conditioned for five minutes, and then the peel strength is measured in comparison to the fresh value. Peel values which indicate good possibility for reuse after soiling are >65% of the fresh value, preferably greater than >70%, more preferably >80%.

Substrate Grease Strikethrough

The strikethrough indicates the capacity of the PSA to alter the transparency of papers in the bonded area as a result of migrated PSA ingredients, i.e. to make the paper lighter (more translucent).

A film strip approximately 20 cm in length is adhered to the paper so that as little air as possible is included. The strip is rolled over with a 1 kg roller (10 times). The specimens are stored at 40° C.

Assessments are made after 1 week, 2 weeks, 4 weeks, 2 months, 3 months and 6 months.

Assessment is made visually. The parameter assessed is the grease strikethrough in 4 stages:
no strikethrough=no change in transmittance
slight strikethrough=slightly translucent
strikethrough=translucent
severe strikethrough=strongly translucent.

The investigations are made on different types of paper in everyday use (newsprint, magazine paper, writing paper, poster paper).

The intention of the text below is to illustrate the invention with reference to examples, though without wishing thereby to restrict it.

EXAMPLES

Application of the polyurethane coatings in the examples took place on a standard laboratory coating unit for continuous coating. The sheet width was 50 cm. The coating slot width was variably adjustable between 0 and 1 cm. The length of the heating tunnel was about 12 m. The temperature in the heating tunnel was divisible into four zones each freely selectable between room temperature and 120° C.

A standard multi-component mixing and metering unit with a dynamic mixing system was used. The mixing head was designed for two liquid components. The mixing rotor had a variable speed of up to approximately 5000 rpm max. The metering pumps of this unit were gear pumps delivering an output of approximately 2 l/min max.

The polyol components and, respectively, the components comprising the isocyanate-reactive substances were prepared in a standard heatable and evacuable mixing tank. During the mixing operation, which took about two hours in each case, the temperature of the mixture was set at about 70° C. and a vacuum was applied in order to degas the components.

Table 1 lists the base materials used to prepare the polyurethane PSAs, in each case with their trade names and manufacturers. The raw materials cited are all freely available commercially.

TABLE 1

Base materials used to prepare the polyurethane PSAs, with trade names and manufacturers

| Trade name | Chemical basis Average molar mass OH or NCO number | Manufacturer/ Supplier |
|---|---|---|
| Desmophen 1262 BD ® | Polypropylene glycol, diol (M = 430) (4661 mmol OH/kg) | Bayer |
| Voranol P 400 ® | Polypropylene glycol, diol (M = 400) (4643 mmol OH/kg) | Dow |
| Desmophen 1112 BD ® | Polypropylene glycol, diol (M = 1000) (1977 mmol OH/kg) | Bayer |
| Acclaim 4220 N ® | Polypropylene glycol, diol, high-purity, prepared by DMC catalysis (M = 4000) (500 mmol OH/kg) | Bayer |
| Desmophen 1380 BT ® | Polypropylene glycol, triol (M = 450) (6774 mmol OH/kg) | Bayer |
| Desmophen 3061 BT ® | Polypropylene glycol, triol (M = 3000) (1000 mmol OH/kg) | Bayer |
| Desmophen 5035 BT ® | Polypropylene glycol, triol (M = 4800) (624 mmol OH/kg) | Bayer |
| Desmophen 5031 BT ® | Polypropylene glycol, triol (M = 6000) (502 mmol OH/kg) | Bayer |
| Acclaim 6320 N ® | Polypropylene glycol, triol, high-purity, prepared by DMC catalysis (M = 6000) (500 mmol OH/kg) | Bayer |
| Vestanat IPDI ® | Isophorone diisocyanate (M = 222.3) (8998 mmol NCO/kg) | Degussa-Hüls |
| Desmodur N 3300 ® | Aliphatic polyisocyanate based on hexamethylene diisocyanate (5143 mmol NCO/kg) | Bayer |
| Desmodur W ® | Dicyclohexylmethane diisocyanate (M = 262) (7571 mmol NCO/kg) | Bayer |
| Desmodur CD ® | Modified diphenylmethane 4,4'-diisocyanate (7023 mmol NCO/kg) | Bayer |
| Mark DBTL ® | Dibutyltin dilaurate | Nordmann, Rassmann |
| Tinuvin 292 ® | Sterically hindered amine, light stabilizer | Ciba |
| Tinuvin 400 ® | Triazine derivative, UV stabilizer | Ciba |
| Aerosil R202 ® | Hydrophobicized pyrogenic silica | Degussa-Hüls |

Additionally, the following elastomers were used as materials for the elastomeric backing sheets:

TABLE 2

Materials used to produce the elastomeric backing sheets

| Trade name | Chemical basis | Manufacturer | Maximum tensile stress (N/mm$^2$) | Maximum stretchability (%) |
|---|---|---|---|---|
| Vector 8508 ® | SBS | Exxon | 31.0 | 900 |
| Kraton G 1652 ® | SEBS | Kraton Polymers | 31.0 | 500 |
| Elvax 310 ® | EVA | Du Pont | 3.3 | 900 |

The elastomeric backing sheets were each produced in a standard extrusion process from the materials listed in Table 2, in 500 mm width.

Prior to coating with the polyurethane PSA, the elastomeric backing sheets were subjected to corona treatment on one or both sides, depending on whether a single-sidedly or double-sidedly PSA product was to be produced.

Example 1

The double-sidedly pressure-sensitively adhesive elastic sheet is in single-layer form. The thickness of the layer is 1.0 mm and it is composed of a polyurethane PSA having the following composition:

NCO/OH ratio: 1.0

Ratio of number of diol OH/number of triol OH: 1.5

| | Ingredient | Weight fraction [% by weight] | Number of OH or NCO groups, based on the percentage weight fraction |
|---|---|---|---|
| A component | Desmophen 1262 BD ® | 12.0 | 55.9 mmol OH |
| | Desmophen 5031 BT ® | 74.4 | 37.3 mmol OH |
| | Mark DBTL ® | 0.3 | |
| | Tinuvin 292 ® | 0.3 | |
| | Tinuvin 400 ® | 0.6 | |
| | Aerosil R202 ® | 2.0 | |
| B component | Vestanat IPDI ® | 10.4 | 93.2 mmol NCO |

Characterizing Test Results:

| | |
|---|---|
| Bond strength on steel, 90° peel angle: | 1.5 N/cm |
| Comparative example | 1.9 N/cm |
| Bond strength on steel, 90° peel angle, with dimensionally stabilizing (inelastic) reverse-face reinforcement of the adhesive sheet: | |
| Bond strength on PETP, 90° peel angle: | 1.9 N/cm |
| Bond strength on PVC, 90° peel angle: | 2.8 N/cm |
| Bond strength on paper 90° peel angle: | 1.4 N/cm |
| Bond strength on paper 90° peel angle, after three months' storage of the adhesive assembly: | 1.2 N/cm |
| Maximum tensile stress: | 1.3 N/mm$^2$ |
| Tensile stress at 200% elongation | 0.2 N/mm$^2$ |
| Maximum stretchability: | 1100% |
| Stripping stress: | 0.5 N/mm$^2$ |
| Ratio of maximum tensile stress/stripping stress: | 2.6 |
| Recovery: | >95% |
| Reusability: | >90% of the fresh value |

Example 2

The double-sidedly pressure-sensitively adhesive elastic sheet is in single-layer form. The thickness of the layer is 1.0 mm and it is composed of a polyurethane PSA having the following composition:

NCO/OH ratio: 1.0

Ratio of number of diol OH/number of triol OH: 2.5

| | Ingredient | Weight fraction [% by weight] | Number of OH or NCO groups, based on the percentage weight fraction |
|---|---|---|---|
| A component | Desmophen 1262 BD ® | 17.8 | 82.9 mmol OH |
| | Desmophen 5031 BT ® | 66.1 | 33.2 mmol OH |
| | Mark DBTL ® | 0.3 | |
| | Tinuvin 292 ® | 0.3 | |
| | Tinuvin 400 ® | 0.6 | |
| | Aerosil R202 ® | 2.0 | |
| B component | Vestanat IPDI ® | 12.9 | 116.1 mmol NCO |

Characterizing Test Results:

| | |
|---|---|
| Bond strength on steel, 90° peel angle: | 2.2 N/cm |
| Comparative example | 2.8 N/cm |
| Bond strength on steel, 90° peel angle, with dimensionally stabilizing (inelastic) reverse-face reinforcement of the adhesive sheet: | |
| Bond strength on PETP, 90° peel angle: | 2.4 N/cm |
| Bond strength on PVC, 90° peel angle: | 2.9 N/cm |
| Bond strengthon on paper 90° peel angle: | 1.8 N/cm |
| Bond strength on paper 90° peel angle, after three months' storage of the adhesive assembly: | 1.6 N/cm |
| Maximum tensile stress: | 1.2 N/mm$^2$ |
| Tensile stress at 200% elongation | 0.2 N/mm$^2$ |
| Maximum stretchability: | 1000% |
| Stripping stress: | 0.7 N/mm$^2$ |
| Ratio of maximum tensile stress/stripping stress: | 1.7 |
| Recovery: | >95% |
| Reusability: | >90% of the fresh value |
| Reusability after soiling: | >90% of the fresh value |
| Substrate grease strikethrough: | no strikethrough after 6 months |

Example 3

The double-sidedly pressure-sensitively adhesive elastic sheet is in single-layer form. The thickness of the layer is 1.0 mm and it is composed of a polyurethane PSA having the following composition:

NCO/OH ratio: 1.0

Ratio of number of diol OH/number of triol OH: 2.5

| | Ingredient | Weight fraction [% by weight] | Number of OH or NCO groups, based on the percentage weight fraction |
|---|---|---|---|
| A component | Desmophen 1262 BD ® | 17.7 | 82.7 mmol OH |
| | Acclaim 6320 N ® | 66.2 | 33.1 mmol OH |
| | Mark DBTL ® | 0.3 | |
| | Tinuvin 292 ® | 0.3 | |
| | Tinuvin 400 ® | 0.6 | |
| | Aerosil R202 ® | 2.0 | |
| B component | Vestanat IPDI ® | 12.9 | 115.8 mmol NCO |

Characterizing Test Results:

| | |
|---|---|
| Bond strength on steel, 90° peel angle: | 1.6 N/cm |
| Comparative example | 2.1 N/cm |
| Bond strength on steel, 90° peel angle, with dimensionally stabilizing (inelastic) reverse-face reinforcement of the adhesive sheet: | |
| Bond strength on PETP, 90° peel angle: | 1.7 N/cm |
| Bond strength on PVC, 90° peel angle: | 2.9 N/cm |
| Bond strength on paper 90° peel angle: | 1.3 N/cm |
| Bond strength on paper 90° peel angle, after three months' storage of the adhesive assembly: | 1.0 N/cm |
| Maximum tensile stress: | 1.4 N/mm$^2$ |
| Tensile stress at 200% elongation | 0.2 N/mm$^2$ |
| Maximum stretchability: | 1200% |
| Stripping stress: | 0.3 N/mm$^2$ |
| Ratio of maximum tensile stress/stripping stress: | 4.7 |
| Recovery: | >95% |
| Reusability: | >90% of the fresh value |
| Reusability after soiling: | >90% of the fresh value |
| Substrate grease strikethrough: | no strikethrough after 6 months |

Example 4

The double-sidedly pressure-sensitively adhesive elastic sheet is in single-layer form. The thickness of the layer is 0.8 mm and it is composed of a polyurethane PSA having the following composition:

NCO/OH ratio: 1.0

Ratio of number of diol OH/number of triol OH: 2.5

| | Ingredient | Weight fraction [% by weight] | Number of OH or NCO groups, based on the percentage weight fraction |
|---|---|---|---|
| A component | Desmophen 1262 BD ® | 20.5 | 95.7 mmol OH |
| | Desmophen 5035 BT ® | 61.4 | 38.3 mmol OH |
| | Mark DBTL ® | 0.3 | |
| | Tinuvin 292 ® | 0.3 | |
| | Tinuvin 400 ® | 0.6 | |
| | Aerosil R202 ® | 2.0 | |
| B component | Vestanat IPDI ® | 14.9 | 134.0 mmol NCO |

Characterizing Test Results:

| | |
|---|---|
| Bond strength on steel, 90° peel angle: | 2.5 N/cm |
| Comparative example | 3.5 N/cm |
| Bond strength on steel, 90° peel angle, with dimensionally stabilizing (inelastic) reverse-face reinforcement of the adhesive sheet: | |
| Bond strength on PETP, 90° peel angle: | 2.4 N/cm |
| Bond strength on PVC, 90° peel angle: | 3.2 N/cm |
| Bond strength on paper 90° peel angle: | 1.8 N/cm |
| Bond strength on paper 90° peel angle, after three months' storage of the adhesive assembly: | 1.8 N/cm |
| Maximum tensile stress: | 1.3 N/mm$^2$ |
| Tensile stress at 200% elongation | 0.2 N/mm$^2$ |
| Maximum stretchability: | 900% |
| Stripping stress: | 0.8 N/mm$^2$ |
| Ratio of maximum tensile stress/stripping stress: | 1.6 |
| Recovery: | >95% |
| Reusability: | >90% of the fresh value |
| Reusability after soiling: | >90% of the fresh value |
| Substrate grease strikethrough: | no strikethrough after 6 months |

Example 5

The double-sidedly pressure-sensitively adhesive elastic sheet is in single-layer form. The thickness of the layer is 0.7 mm and it is composed of a polyurethane PSA having the following composition:

NCO/OH ratio: 0.95

Ratio of number of diol OH/number of triol OH: 1.5

| | Ingredient | Weight fraction [% by weight] | Number of OH or NCO groups, based on the percentage weight fraction |
|---|---|---|---|
| A component | Desmophen 1262 BD ® | 19.7 | 91.8 mmol OH |
| | Desmophen 3061 BT ® | 61.0 | 61.0 mmol OH |
| | Mark DBTL ® | 0.3 | |
| | Tinuvin 292 ® | 0.3 | |
| | Tinuvin 400 ® | 0.6 | |
| | Aerosil R202 ® | 2.0 | |
| B component | Vestanat IPDI ® | 16.1 | 145.0 mmol NCO |

Characterizing Test Results:

| | |
|---|---|
| Bond strength on steel, 90° peel angle: | 1.6 N/cm |
| Comparative example | 2.3 N/cm |
| Bond strength on steel, 90° peel angle, with dimensionally stabilizing (inelastic) reverse-face reinforcement of the adhesive sheet: | |
| Bond strength on PETP, 90° peel angle: | 1.4 N/cm |
| Bond strength on PVC, 90° peel angle: | 2.4 N/cm |
| Bond strength on paper 90° peel angle: | 1.3 N/cm |
| Bond strength on paper 90° peel angle, after three months' storage of the adhesive assembly: | 1.0 N/cm |
| Maximum tensile stress: | 1.8 N/mm$^2$ |
| Tensile stress at 200% elongation | 0.3 N/mm$^2$ |
| Maximum stretchability: | 800% |
| Stripping stress: | 0.4 N/mm$^2$ |
| Ratio of maximum tensile stress/stripping stress: | 4.5 |
| Recovery: | >95% |
| Reusability: | >90% of the fresh value |
| Reusability after soiling: | >90% of the fresh value |
| Substrate grease strikethrough: | no strikethrough after 6 months |

Example 6

The double-sidedly pressure-sensitively adhesive elastic sheet is in single-layer form. The thickness of the layer is 1.2 mm and it is composed of a polyurethane PSA having the following composition:

NCO/OH ratio: 0.9

Ratio of number of diol OH/number of triol OH: 2.5

| | Ingredient | Weight fraction [% by weight] | Number of OH or NCO groups, based on the percentage weight fraction |
|---|---|---|---|
| A component | Desmophen 1262 BD ® | 16.5 | 77.0 mmol OH |
| | Desmophen 5031 BT ® | 61.5 | 30.8 mmol OH |
| | Mark DBTL ® | 0.3 | |
| | Tinuvin 292 ® | 0.3 | |
| | Tinuvin 400 ® | 0.6 | |
| | Aerosil R202 ® | 2.0 | |
| B component | Desmophen N 3300 ® | 18.8 | 97.1 mmol NCO |

Characterizing Test Results:

| | |
|---|---|
| Bond strength on steel, 90° peel angle: | 2.4 N/cm |
| Comparative example | 3.5 N/cm |
| Bond strength on steel, 90° peel angle, with dimensionally stabilizing (inelastic) reverse-face reinforcement of the adhesive sheet: | |
| Bond strength on PETP, 90° peel angle: | 2.4 N/cm |
| Bond strength on PVC, 90° peel angle: | 3.4 N/cm |
| Bond strength on paper 90° peel angle: | 2.6 N/cm |
| Bond strength on paper 90° peel angle, after three months' storage of the adhesive assembly: | 2.8 N/cm |
| Maximum tensile stress: | 0.8 N/mm$^2$ |
| Tensile stress at 200% elongation | 0.1 N/mm$^2$ |
| Maximum stretchability: | 700% |
| Stripping stress: | 0.7 N/mm$^2$ |
| Ratio of maximum tensile stress/stripping stress: | 1.1 |
| Recovery: | >95% |
| Reusability: | >90% of the fresh value |
| Reusability after soiling: | >90% of the fresh value |
| Substrate grease strikethrough: | no strikethrough after 3 months slight strikethrough after 6 months |

Example 7

The double-sidedly pressure-sensitively adhesive elastic sheet is in single-layer form. The thickness of the layer is 1.0 mm and it is composed of a polyurethane PSA having the following composition:

NCO/OH ratio: 0.85

Ratio of number of diol OH/number of triol OH: 2.5

|  | Ingredient | Weight fraction [% by weight] | Number of OH or NCO groups, based on the percentage weight fraction |
|---|---|---|---|
| A component | Desmophen 1262 BD ® | 17.8 | 82.8 mmol OH |
|  | Desmophen 5031 BT ® | 66.0 | 33.2 mmol OH |
|  | Mark DBTL ® | 0.3 |  |
|  | Tinuvin 292 ® | 0.3 |  |
|  | Tinuvin 400 ® | 0.6 |  |
|  | Aerosil R202 ® | 2.0 |  |
| B component | Desmodur W ® | 13.0 | 98.6 mmol NCO |

Characterizing Test Results:

| | |
|---|---|
| Bond strength on steel, 90° peel angle: | 2.5 N/cm |
| Comparative example | 3.5 N/cm |
| Bond strength on steel, 90° peel angle, with dimensionally stabilizing (inelastic) reverse-face reinforcement of the adhesive sheet: | |
| Bond strength on PETP, 90° peel angle: | 2.4 N/cm |
| Bond strength on PVC, 90° peel angle: | 3.1 N/cm |
| Bond strength on paper 90° peel angle: | 1.8 N/cm |
| Bond strength on paper 90° peel angle, after three months' storage of the adhesive assembly: | 2.1 N/cm |
| Maximum tensile stress: | 0.7 N/mm$^2$ |
| Tensile stress at 200% elongation | 0.1 N/mm$^2$ |
| Maximum stretchability: | 1000% |
| Stripping stress: | 0.4 N/mm$^2$ |
| Ratio of maximum tensile stress/stripping stress: | 1.8 |
| Recovery: | >95% |
| Reusability: | >90% of the fresh value |
| Reusability after soiling: | >90% of the fresh value |
| Substrate grease strikethrough: | no strikethrough after 1 month slight strikethrough after 3 months strikethrough after 6 months |

Example 8

The double-sidedly pressure-sensitively adhesive elastic sheet is in single-layer form. The thickness of the layer is 1.0 mm and it is composed of a polyurethane PSA having the following composition:
NCO/OH ratio: 1.0
Ratio of number of diol OH/number of triol OH: 2.5

|  | Ingredient | Weight fraction [% by weight] | Number of OH or NCO groups, based on the percentage weight fraction |
|---|---|---|---|
| A component | Desmophen 1112 BD ® | 46.2 | 91.3 mmol OH |
|  | Desmophen 3061 BT ® | 36.5 | 36.5 mmol OH |
|  | Mark DBTL ® | 0.3 |  |
|  | Tinuvin 292 ® | 0.3 |  |
|  | Tinuvin 400 ® | 0.6 |  |
|  | Aerosil R202 ® | 2.0 |  |
| B component | Vestanat IPDI ® | 14.1 | 127.8 mmol NCO |

Characterizing Test Results:

| | |
|---|---|
| Bond strength on steel, 90° peel angle: | 1.2 N/cm |
| Comparative example | 1.8 N/cm |
| Bond strength on steel, 90° peel angle, with dimensionally stabilizing (inelastic) reverse-face reinforcement of the adhesive sheet: | |
| Bond strength on PETP, 90° peel angle: | 1.0 N/cm |
| Bond strength on PVC, 90° peel angle: | 2.1 N/cm |
| Bond strength on paper 90° peel angle: | 0.9 N/cm |
| Bond strength on paper 90° peel angle, after three months' storage of the adhesive assembly: | 0.8 N/cm |
| Maximum tensile stress: | 0.8 N/mm$^2$ |
| Tensile stress at 200% elongation | 0.1 N/mm$^2$ |
| Maximum stretchability: | 1300% |
| Stripping stress: | 0.2 N/mm$^2$ |
| Ratio of maximum tensile stress/stripping stress: | 4.0 |
| Recovery: | >95% |
| Reusability: | >90% of the fresh value |
| Reusability after soiling: | >90% of the fresh value |
| Substrate grease strikethrough: | no strikethrough after 6 months |

Example 9

The double-sidedly pressure-sensitively adhesive elastic sheet is in single-layer form. The thickness of the layer is 1.0 mm and it is composed of a polyurethane PSA having the following composition:
NCO/OH ratio: 1.0
Ratio of number of diol OH/number of triol OH: 0.5

|  | Ingredient | Weight fraction [% by weight] | Number of OH or NCO groups, based on the percentage weight fraction |
|---|---|---|---|
| A component | Acclaim 4220 N ® | 73.6 | 36.8 mmol OH |
|  | Desmophen 1380 BT ® | 11.1 | 73.6 mmol OH |
|  | Mark DBTL ® | 0.3 |  |
|  | Tinuvin 292 ® | 0.3 |  |
|  | Tinuvin 400 ® | 0.6 |  |
|  | Aerosil R202 ® | 2.0 |  |
| B component | Vestanat IPDI ® | 12.1 | 110.4 mmol NCO |

Characterizing Test Results:

| | |
|---|---|
| Bond strength on steel, 90° peel angle: | 2.8 N/cm |
| Comparative example | 3.3 N/cm |
| Bond strength on steel, 90° peel angle, with dimensionally stabilizing (inelastic) reverse-face reinforcement of the adhesive sheet: | |
| Bond strength on PETP, 90° peel angle: | 2.4 N/cm |
| Bond strength on PVC, 90° peel angle: | 3.2 N/cm |
| Bond strength on paper 90° peel angle: | 2.2 N/cm |
| Bond strength on paper 90° peel angle, after three months' storage of the adhesive assembly: | 2.1 N/cm |
| Maximum tensile stress: | 0.9 N/mm$^2$ |
| Tensile stress at 200% elongation | 0.1 N/mm$^2$ |
| Maximum stretchability: | 1400% |
| Stripping stress: | 0.4 N/mm$^2$ |
| Ratio of maximum tensile stress/stripping stress: | 2.3 |
| Recovery: | >95% |
| Reusability: | >90% of the fresh value |

-continued

| | |
|---|---|
| Reusability after soiling: | >90% of the fresh value |
| Substrate grease strikethrough: | no strikethrough after 6 months |

Example 10

The double-sidedly pressure-sensitively adhesive elastic sheet is in single-layer form. The thickness of the layer is 1.0 mm and it is composed of a polyurethane PSA having the following composition:

NCO/OH ratio: 0.85
Ratio of number of diol OH/number of triol OH: 2.5

| | Ingredient | Weight fraction [% by weight] | Number of OH or NCO groups, based on the percentage weight fraction |
|---|---|---|---|
| A component | Desmophen 1262 BD ® | 17.6 | 81.9 mmol OH |
| | Desmophen 5031 BT ® | 65.3 | 32.8 mmol OH |
| | Mark DBTL ® | 0.3 | |
| | Tinuvin 292 ® | 0.3 | |
| | Tinuvin 400 ® | 0.6 | |
| | Aerosil R202 ® | 2.0 | |
| B component | Desmodur CD ® | 13.9 | 97.5 mmol NCO |

Characterizing Test Results:

| | |
|---|---|
| Bond strength on steel, 90° peel angle: | 2.5 N/cm |
| Comparative example | 3.5 N/cm |
| Bond strength on steel, 90° peel angle, with dimensionally stabilizing (inelastic) reverse-face reinforcement of the adhesive sheet: | |
| Bond strength on PETP, 90° peel angle: | 2.0 N/cm |
| Bond strength on PVC, 90° peel angle: | 3.3 N/cm |
| Bond strength on paper 90° peel angle: | 2.0 N/cm |
| Bond strength on paper 90° peel angle, after three months' storage of the adhesive assembly: | 2.6 N/cm |
| Maximum tensile stress: | 1.0 N/mm$^2$ |
| Tensile stress at 200% elongation | 0.2 N/mm$^2$ |
| Maximum stretchability: | 700% |
| Stripping stress: | 0.5 N/mm$^2$ |
| Ratio of maximum tensile stress/stripping stress: | 2.0 |
| Recovery: | 99% |
| Reusability: | >90% of the fresh value |
| Reusability after soiling: | >90% of the fresh value |
| Substrate grease strikethrough: | no strikethrough after 1 month slight strikethrough after 2 months strikethrough after 6 months |

Example 11

The double-sidedly pressure-sensitively adhesive elastic sheet is in three-layer form. The middle layer is an elastomeric backing sheet of Vector 8508® in a thickness of 50 μm. The two outer polyurethane PSA layers each have the same composition as the PSA in Example 1. The thickness of the two PSA layers is 0.5 mm each.

Characterizing Test Results:

| | |
|---|---|
| Bond strength on steel, 90° peel angle: | 1.3 N/cm |
| Comparative example | 1.9 N/cm |
| Bond strength on steel, 90° peel angle, with dimensionally stabilizing (inelastic) reverse-face reinforcement of the adhesive sheet: | |
| Bond strength on PETP, 90° peel angle: | 1.8 N/cm |
| Bond strength on PVC, 90° peel angle: | 2.6 N/cm |
| Bond strength on paper 90° peel angle: | 1.2 N/cm |
| Bond strength on paper 90° peel angle, after three months' storage of the adhesive assembly: | 1.2 N/cm |
| Maximum tensile stress: | 1.5 N/mm$^2$ |
| Tensile stress at 200% elongation | 0.2 N/mm$^2$ |
| Maximum stretchability: | 800% |
| Stripping stress: | 0.5 N/mm$^2$ |
| Ratio of maximum tensile stress/stripping stress: | 3.0 |
| Recovery: | >95% |
| Reusability: | >90% of the fresh value |
| Reusability after soiling: | >90% of the fresh value |
| Substrate grease strikethrough: | no strikethrough after 6 months |

Example 12

The double-sidedly pressure-sensitively adhesive elastic sheet is in three-layer form. The middle layer is an elastomeric backing sheet of Kraton G 1652® in a thickness of 50 μm. The two outer polyurethane PSA layers each have the same composition as the PSA in Example 1. The thickness of the two PSA layers is 0.4 mm each.

Characterizing Test Results:

| | |
|---|---|
| Bond strength on steel, 90° peel angle: | 1.4 N/cm |
| Comparative example | 2.2 N/cm |
| Bond strength on steel, 90° peel angle, with dimensionally stabilizing (inelastic) reverse-face reinforcement of the adhesive sheet: | |
| Bond strength on PETP, 90° peel angle: | 1.5 N/cm |
| Bond strength on PVC, 90° peel angle: | 2.5 N/cm |
| Bond strength on paper 90° peel angle: | 1.4 N/cm |
| Bond strength on paper 90° peel angle, after three months' storage of the adhesive assembly: | 0.9 N/cm |
| Maximum tensile stress: | 1.3 N/mm$^2$ |
| Tensile stress at 200% elongation | 0.2 N/mm$^2$ |
| Maximum stretchability: | 900% |
| Stripping stress: | 0.4 N/mm$^2$ |
| Ratio of maximum tensile stress/stripping stress: | 3.3 |
| Recovery: | >95% |
| Reusability: | >90% of the fresh value |
| Reusability after soiling: | >90% of the fresh value |
| Substrate grease strikethrough: | no strikethrough after 6 months |

Example 13

The double-sidedly pressure-sensitively adhesive elastic sheet is in three-layer form. The middle layer is an elastomeric backing sheet of Elvax 310® in a thickness of 100 μm. The two outer polyurethane PSA layers each have the same composition as the PSA in Example 1. The thickness of the two PSA layers is 0.5 mm each.

Characterizing Test Results:

| | |
|---|---|
| Bond strength on steel, 90° peel angle: | 1.6 N/cm |
| Comparative example | 2.3 N/cm |
| Bond strength on steel, 90° peel angle, with dimensionally stabilizing (inelastic) reverse-face reinforcement of the adhesive sheet: | |
| Bond strength on PETP, 90° peel angle: | 1.9 N/cm |
| Bond strength on PVC, 90° peel angle: | 3.0 N/cm |
| Bond strength on paper 90° peel angle: | 1.4 N/cm |
| Bond strength on paper 90° peel angle, after three months' storage of the adhesive assembly: | 1.0 N/cm |
| Maximum tensile stress: | 1.4 N/mm² |
| Tensile stress at 200% elongation | 0.2 N/mm² |
| Maximum stretchability: | 1000% |
| Stripping stress: | 0.5 N/mm² |
| Ratio of maximum tensile stress/stripping stress: | 2.8 |
| Recovery: | >95% |
| Reusability: | >90% of the fresh value |
| Reusability after soiling: | >90% of the fresh value |
| Substrate grease strikethrough: | no strikethrough after 6 months |

Example 14

The double-sidedly pressure-sensitively adhesive elastic sheet is in two-layer form. The elastomeric backing sheet is composed of Elvax 310® in a thickness of 50 μm. The polyurethane PSA has the same composition as the PSA in Example 1. Its thickness is 0.8 mm each.

Characterizing Test Results:

| | |
|---|---|
| Bond strength on steel, 90° peel angle: | 1.7 N/cm |
| Comparative example | 2.9 N/cm |
| Bond strength on steel, 90° peel angle, with dimensionally stabilizing (inelastic) reverse-face reinforcement of the adhesive sheet: (the reverse-face reinforcement in this example was attached using a conventional polyacrylate PSA) | |
| Bond strength on PETP, 90° peel angle: | 1.7 N/cm |
| Bond strength on PVC, 90° peel angle: | 3.1 N/cm |
| Bond strength on paper 90° peel angle: | 1.4 N/cm |
| Bond strength on paper 90° peel angle, after three months' storage of the adhesive assembly: | 1.2 N/cm |
| Maximum tensile stress: | 1.3 N/mm² |
| Tensile stress at 200% elongation | 0.2 N/mm² |
| Maximum stretchability: | 800% |
| Stripping stress: | 0.3 N/mm² |
| Ratio of maximum tensile stress/stripping stress: | 4.3 |
| Recovery: | >95% |
| Reusability: | >90% of the fresh value |
| Reusability after soiling: | >90% of the fresh value |
| Substrate grease strikethrough: | no strikethrough after 6 months |

Test specimens of Examples 1 to 14 were redetachable both by peeling and by stripping from various kinds of paper (newsprint, magazine paper, writing paper, poster paper) without damaging the papers. Detachment without damage was also possible after a bonding time of 3 months.

Test specimens measuring 3×3 cm² of each of Examples 1 to 14 were screwed up by hand. They became smoothed out again after a few minutes by themselves, retained their original form completely, and were able to be used again in each case.

Comparative Example

The construction is a single-layered one. The thickness of the layer is 1.0 mm and it is composed of a polyurethane PSA having the following composition:
NCO/OH ration: 1.0
Only diols, no triol

| | Ingredient | Weight fraction [% by weight] | Number of OH or NCO groups, based on the percentage weight fraction |
|---|---|---|---|
| A component | Desmophen 1262 BD ® | 37.0 | 172.5 mmol OH |
| | Acclaim 4220 N ® | 38.5 | 19.2 mmol OH |
| | Mark DBTL ® | 0.3 | |
| | Tinuvin 292 ® | 0.3 | |
| | Tinuvin 400 ® | 0.6 | |
| | Aerosil R202 ® | 2.0 | |
| B component | Vestanat IPDI ® | 21.3 | 191.7 mmol NCO |

After just one day, bonds on paper can no longer be removed by peeling without damage. After just a week, grease strikethrough occurs on paper. Screwed-up test specimens are not smoothed again in dimensionally stable fashion by themselves.

The invention claimed is:

1. Single-sidedly or double-sidedly pressure-sensitively adhesive, elastic adhesive sheet comprising at least one layer of a pressure-sensitive adhesive, and having
a maximum stretchability of more than 200% and a recovery of more than 60% after stretching to ⅔ of its maximum elongation, said pressure-sensitive adhesive (PSA) being based on a chemically crosslinked polyurethane, wherein the starting materials for the chemically crosslinked polyurethane include at least one isocyanate-reactive substance having a functionality of more than 2.0, in an amount of at least 5% by weight, based on the weight of the polyurethane composition,
the molecular weight of at least one of the starting materials used to form the polyurethane being greater than or equal to 1000,
at least difunctional polyisocyanates being used to form the polyurethane, and the ratio of maximum tensile stress to stripping stress of said elastic adhesive sheet being more than 1.2, and
the tensile stress at an elongation of 200% being not more than 2.0 N/mm².

2. Elastic adhesive sheet according to claim 1, wherein the polyurethane is formed of the following starting materials which are reacted with one another in the stated proportions:
at least one difunctional polyisocyanate,
a combination of at least one polypropylene glycol diol and at least one polypropylene glycol triol, the ratio of the number of hydroxyl groups in the diol component to the number of hydroxyl groups in the triol component being between 0.7 and 9.0, of the number of isocyanate groups to the total number of hydroxyl groups being between 0.5 and 1.3,
where diols having a molecular weight of less than or equal to 1000 are combined with triols whose molecular weight is greater than 1000, or diols having a molecular weight of greater than 1000 are combined with triols whose molecular weight is less than 1000.

3. Elastic adhesive sheet according to claim 1, wherein the adhesive sheet has a maximum stretchability of more than 300%, and/or a recovery of more than 80%, after stretching to ⅔ of its maximum elongation.

4. Elastic adhesive sheet according to claim 1, wherein the polyisocyanate is an aliphatic or alicyclic diisocyanate.

5. Elastic adhesive sheet according to claim 1, wherein the isocyanate is isophorone diisocyanate.

6. Elastic adhesive sheet according to claim 1, wherein the isocyanate-reactive substances used are polyols.

7. Elastic adhesive sheet according to claim 1, having a backing sheet applied to one side of the pressure-sensitive adhesive.

8. Elastic adhesive sheet according to claim 1, wherein the elastic adhesive sheet is a multi-ply laminate comprised of one or more elastic backing sheets and one or more layers of the polyurethane-based pressure-sensitive adhesive.

9. Elastic adhesive sheet according to claim 1, wherein the adhesive sheet is in a form which is partially non-tacky at one or more ends thereof, so that there are one or more grip tab regions starting from which the parting of the adhesive bond can be performed.

10. Elastic adhesive sheet according to claim 1, wherein said pressure-sensitive adhesive comprises formulating constituents selected from the group consisting of catalysts, ageing inhibitors, light stabilizers, UV absorbers and rheological additives.

11. Elastic adhesive sheet according to claim 1 having a peel strength on steel, determined at a peel angle of 90°, of between 0.05 and 8 N/cm.

12. Elastic adhesive sheet according to claim 1, wherein the stripping forces measured during detachment by extensive stretching in the bond plane are less than 2.5 N/mm².

13. Elastic adhesive sheet according to claim 1, in the form of diecuts or cut shapes.

14. Process for producing the pressure-sensitive adhesive sheet of claim 1, which comprises a) charging a vessel A with the premixed isocyanate-reactive substances (polyol component) and charging a vessel B with the isocyanate component, b) conveying the polyol component and the isocyanate component via pumps through a mixing head or mixing tube of a multi-component mixing and metering unit, and homogeneously mixing same to bring about a reaction between them, c) applying the chemically inter-reactive components mixed in this way to a sheet form backing material, d) passing the backing material coated with the reactive polyurethane composition through a heating tunnel in which the polyurethane composition cures to form the pressure-sensitive adhesive, e) finally, winding the coated backing material up in a winding station.

15. A method for fastening notes, sheets of paper, calendar pages, strips, cards or cartons of paperboard, cardboard or plastic, small utility articles of plastic, wood, glass, stone or metal, which comprises fastening same with the elastic adhesive sheet of claim 1.

16. The elastic adhesive sheet according to claim 4, wherein said aliphatic or alicyclic diisocyanate has an asymmetrical molecular structure.

17. The elastic adhesive sheet of claim 6, wherein said polyols are selected fro the group consisting of polyether-polyols or polyester-polyols.

* * * * *